(12) United States Patent
Launay

(10) Patent No.: US 8,523,079 B2
(45) Date of Patent: Sep. 3, 2013

(54) SECURITY DOCUMENT COMPRISING A NEAR-FIELD COMMUNICATION DEVICE SUCH AS A PASSPORT

(75) Inventor: François Launay, Vitre (FR)

(73) Assignee: Oberthur Technologies, Levallois Perret (FR)

( * ) Notice: Subject to any disclaimer, the term of this patent is extended or adjusted under 35 U.S.C. 154(b) by 0 days.

(21) Appl. No.: 13/253,831

(22) Filed: Oct. 5, 2011

(65) Prior Publication Data

US 2012/0145795 A1    Jun. 14, 2012

(30) Foreign Application Priority Data

Oct. 5, 2010  (FR) ...................................... 10 58054

(51) Int. Cl.
*G06K 19/02*    (2006.01)

(52) U.S. Cl.
USPC .......................................... 235/488; 235/375

(58) Field of Classification Search
USPC ............ 235/488, 375, 492; 340/572.7, 572.8
See application file for complete search history.

(56) References Cited

U.S. PATENT DOCUMENTS

| | | | | |
|---|---|---|---|---|
| 6,911,911 | B2* | 6/2005 | Surkau et al. | 340/572.7 |
| 7,218,233 | B2* | 5/2007 | Bon | 340/572.8 |
| 7,479,882 | B2* | 1/2009 | Mahaffey | 340/572.3 |
| 2003/0168514 | A1* | 9/2003 | Rancien et al. | 235/492 |
| 2005/0236489 | A1* | 10/2005 | Droz | 235/487 |
| 2009/0315320 | A1* | 12/2009 | Finn | 283/107 |

FOREIGN PATENT DOCUMENTS

| | | |
|---|---|---|
| FR | 2 868 987 | 10/2005 |
| FR | 2 881 251 | 7/2006 |
| WO | WO 2006/000849 | 1/2006 |

* cited by examiner

*Primary Examiner* — Ahshik Kim
(74) *Attorney, Agent, or Firm* — Cozen O'Connor

(57) ABSTRACT

A document (10) comprises a multilayer structure (18) formed by at least two layers (20, 22, 34) assembled together and a near-field communication device (24) incorporated in the thickness of the structure (18). More particularly, the device (24) is in the form of a module (26) comprising a support (28) bearing a near-field communication antenna (30) and a microcircuit (32) and the module (26) comprises an embrittlement zone (46) capable of breaking during separation of the two layers (20, 22, 34) to cause destruction of the module (26).

20 Claims, 2 Drawing Sheets

ND MG SECURITY DOCUMENT COMPRISING A NEAR-FIELD COMMUNICATION DEVICE SUCH AS A PASSPORT

RELATED APPLICATIONS

This application claims the priority of French application Ser. No. 10/58054 filed Oct. 5, 2010, the entire content of which is hereby incorporated by reference.

FIELD OF THE INVENTION

The present invention relates to the technical field of documents security or value documents comprising data, especially personal and/or security data, such as for example passports, bank cards, ID cards.

The invention applies more particularly, though not exclusively, to anti-falsification of electronic documents, comprising a near-field communication device or radio identification device of RFID type ("Radio Frequency Identity"). This RFID device generally comprises a near-field communication antenna and a microcircuit connected to the antenna.

Such a device completes the authentication of the document, further assured by classic optical, visual and/or tactile security elements integrated into the document, such as for example watermarks, holograms, security threads, impressions of personal data, etc. The presence of the microcircuit for example allows the storage of information on the carrier of the document.

BACKGROUND OF THE INVENTION

The prior art already discloses a passport comprising a near-field communication device. For example, the communication device is in the form of an insert, better known by the English term "inlay".

Generally, a passport comprises a booklet formed by a plurality of sheets assembled together along a binding line, of which at least one sheet bears personal data of the carrier, that is, relative to his identity, known as personalisation data, such as his photograph, his name, his private address and security data such as watermarks, security threads or even particular artwork, etc.

An "inlay" or transponder insert comprises generally a substrate made of plastic material in the thickness of which is incorporated a transponder assembly formed by an antenna and a microcircuit attached to the antenna.

This substrate is generally designed to be incorporated between two layers of the document. In the case of the passport, "the inlay" is for example interbedded between the cover and the endpaper, the whole then being put together for example by cold adhesion or hot laminating to form a single page of the passport.

The antenna is formed for example by a winding of electrically conductive coils formed by the printing of conductive ink on one face of the insert and the antenna is connected electrically to the microcircuit by means of conductive pellets.

The disadvantage to this solution however is that it provides a document with a very thick cover, "the inlay" generally having a relatively substantial thickness for incorporating the module entirely within its body.

Also, the connection of the antenna and the microcircuit by means of conductive pellets is particularly sensitive to flexion and twisting.

Now, it is necessary, especially for official documents such as passports, that the service life of such documents be sufficiently long to cover the period of validity of the title defined by the passport.

It is also known, especially from document WO 02/089052, to incorporate the communication device in the cover of the passport in the form of a single component formed by a microcircuit integrating the antenna.

In this document, the cover is formed by at least two layers assembled together in the thickness of which the component is integrated.

However, such a component is particularly heavy. Also, a forger can easily delaminate the layers and extract the component with the aim of later fraudulent use.

SUMMARY OF THE INVENTION

One object of the present invention is to provide a security document comprising a near-field communication device, having no excess thickness at the level of the localisation of the device and offering increased protection against attempts at forgery.

One aspect of the invention is directed to a security document, comprising a multilayer structure formed by at least two layers assembled together face to face and a near-field communication device incorporated in the thickness of the structure, characterised in that the device is in the form of a module comprising a support bearing an antenna and a microcircuit and in that the module comprises an embrittlement zone capable of breaking during separation of at least the two layers to cause destruction of the module.

First, the device is in the form of a module, ensuring mechanical protection of the connection between the microcircuit and the antenna from forces of torsion and/or flexion likely to be undergone by the document, especially due to the presence of the support. In fact, the support consolidates the connection of the microcircuit and of the antenna by reducing the impact of forces of flexion or torsion applied to the document on the connection of the two components, limiting the risks of the two components being detached from one another.

Also, because of the invention, the document is better protected from forgery attempts. In fact, during any attempt to extract the device from the document, the separation of the layers causes destruction of the module, preventing any future fraudulent use.

A document according to an embodiment of the invention further comprises one or more of the characteristics according to which:

- the embrittlement zone extends between first and second parts of the module;
- the first part of the module comprises a near-field communication antenna and the second part comprises the microcircuit;
- the first part is solid with the first layer and the second part is solid with the second layer;
- the document comprises a plurality of sheets joined together to form a booklet, the structure is formed by at least one cover sheet and an endpaper of the booklet;
- the structure further comprises an additional sheet interleaved between the cover sheet and the endpaper, inside which is arranged at least partially the module;
- the module is housed in a cavity made in the thickness of at least two layers of the structure;
- the cavity comprises a deep central reception region of the microcircuit and an elevated peripheral region surrounding the central support region of the support of the module and delimiting a step, the peripheral region extends entirely in one of the two layers;

the cavity extends in the thickness of at least the cover sheet and the additional sheet;

the microcircuit is fixed to the base of the cavity and the module support is solid with the additional sheet and/or the endpaper, to cause detachment of the support and the microcircuit;

the additional sheet has a thickness greater than or equal to the thickness of the support;

the additional sheet is made of material more easily machinable than the material forming the cover sheet;

the additional sheet is made of material based on synthetic and/or natural fibres;

the module is optically concealed in the multilayer structure.

DETAILED DESCRIPTION OF THE PREFERRED EMBODIMENTS

Figure 1:
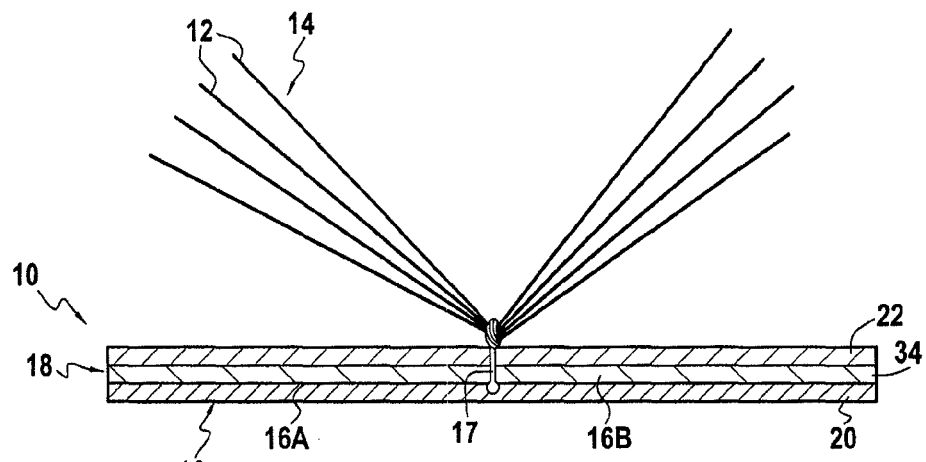
FIG. 1 illustrates a security document such as a passport according to a first embodiment.
Figure 2:
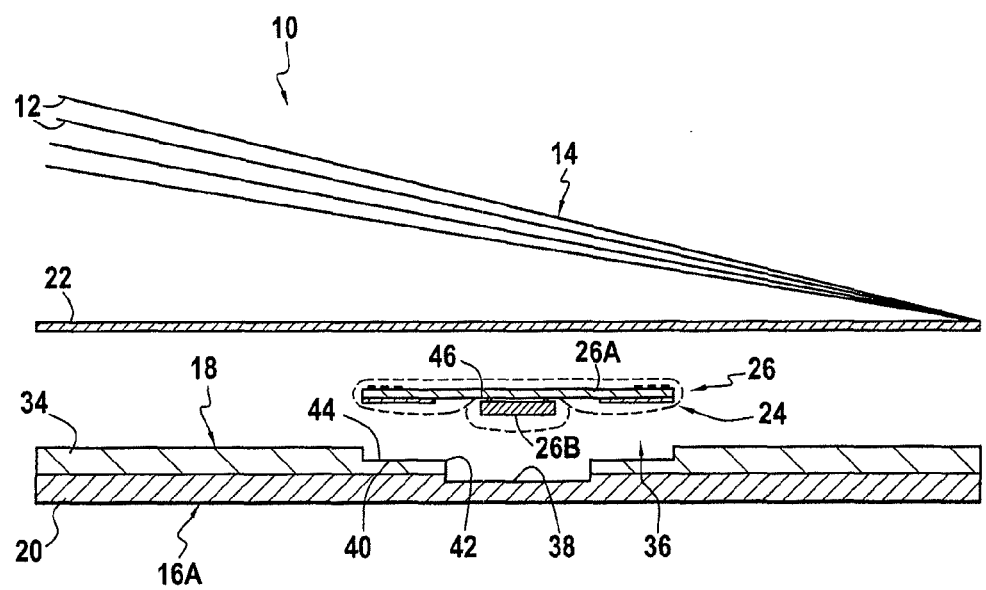
FIG. 2 illustrates a sectional view of the cover of the passport of FIG. 1.
Figure 3:
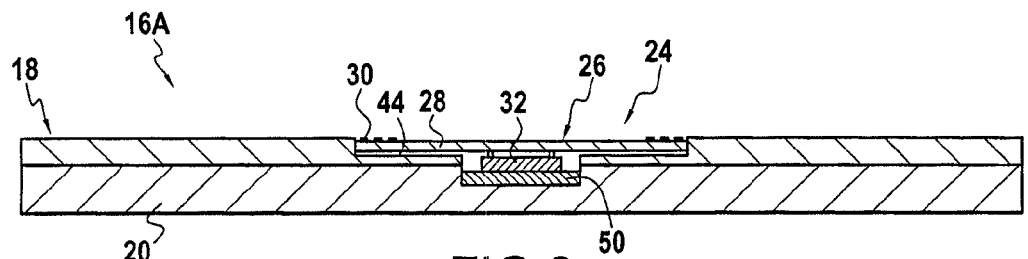
FIG. 3 illustrates a sectional view of a multilayer structure forming the cover of the passport of FIG. 1.

FIG. 1 illustrates a security document according to a first embodiment of the invention. This security document is designated by general reference numeral 10.

In the first embodiment of the invention, illustrated by FIGS. 1 to 5, the security document is a passport. The passport 10 conventionally comprises a plurality of sheets 12 joined together to form a booklet 14. Of the plurality of sheets 12, the booklet 14 also comprises at least one cover flap 16 intended to stiffen the passport 10 and protect the booklet 14 from shocks and various stresses.

The sheets 12 of the booklet 14 are joined together for example along a binding line 17. This binding line 17 is formed for example by sewing or by adhesion or by different adapted assembly processes. This line 17 separates the flap 16 into two sub-flaps, a front flap 16A and a rear flap 16B. The front flap 16A conventionally carries for example fixed indications about the nationality of the carrier, etc.

The flap 16 preferably comprises especially a cover sheet 20. For example, the cover sheet 20 is made of strong granulated paper of the imitation leather genre having a thickness substantially equal to 300 micrometers.

In keeping with the invention, document 10 comprises a multilayer structure 18 formed by at least two layers assembled together to form a unitary assembly.

In the first embodiment, the structure 18 forms the front cover flap 16A of the passport 10 and the two layers of the structure 18 correspond respectively to the cover sheet 20 and to an endpaper 22 of the booklet 14.

The endpaper 22 generally forms a sheet 12 of the booklet 14. Therefore, the verso of the endpaper 22 is arranged opposite the verso of the cover sheet 20. The endpaper 22 can further comprise for example variable data relative to the carrier of the document 10.

The security document 10 further comprises a near-field communication device 24 incorporated in the thickness of the structure 18 and, in the example illustrated in the figures, in the thickness of the front cover flap 16A.

According to the invention, the device 24 is in the form of a module 26 comprising a support 28 bearing a near-field communication antenna 30 and a microcircuit 32.

The support 28 is made for example from material comprising essentially epoxy and this support 28 has for example a thickness of less than 200 micrometers and this thickness is preferably between 70 and 100 micrometers.

As is illustrated in the figures, the microcircuit 32 is preferably assembled by die bonding and is flip-chip mounted in the module 26. This assembly process is currently designated in English terminology by "flip chip" mounting.

This assembly process is characterised especially by a direct electrical connection of the active face of the microcircuit 32 on the support 28 for the electrical connection with appropriate conductors on the support 28 and especially for electrical connection with the antenna 30.

In a variant not illustrated in the figures, the microcircuit 32 can be mounted on the support by a cabling process known as "Wire Bonding" which consists of adhering the microcircuit to the support by its passive face and cabling the microcircuit from its active face for its electrical connection. In this case, the microcircuit and the cables are encapsulated for example in a cap of polymer resin.

Also, the antenna 30 extends for example over one of the faces of the support 28 of the module at the periphery of this support 28. In the example illustrated in the figures, the antenna 30 extends over a single face of the support 28. But, in a variant illustrated especially in FIG. 4, the antenna 30 can extend in two parts on each of the faces of the support 28 of the module 26.

Preferably, and in this first embodiment of the invention, the structure 18 further comprises an additional sheet 34 interleaved between the cover sheet 20 and the endpaper 22 inside which the module 26 is arranged at least partially.

The function of this additional sheet 34 is essentially to increase the thickness of the structure 18 to more easily house the module 26 in its thickness at least partially. For example, the additional sheet 34 has a thickness of between 100 and 300 micrometers.

In the embodiment illustrated on FIG. 1, the additional sheet 34 extends over the entire surface of the flap 16 de cover. However, in a variant not illustrated here, the additional sheet 34 is absent from the part 16B of the flap 16 and extends only in the thickness of the part 16A of the flap 16.

The module 26 is preferably optically concealed inside the structure 18 and the additional sheet 34 preferably has a thickness greater than or equal to the thickness of the support 28.

Also, due to this additional sheet 34 being interleaved between the cover sheet 20 and the endpaper 22, it is invisible from the exterior. Thus, with the difference of the cover sheet 20 which is standardised and which has to respond to a certain number of criteria such as thickness, nature of the material, etc., the material of the additional sheet can be selected freely.

This additional sheet 34 is preferably made of material more easily machinable than the material forming the cover sheet 20. For example, the additional sheet 34 is made of material essentially comprising natural and/or synthetic fibres.

For example, natural fibres are based on cellulose material. As a variant, the material of the additional sheet 34 can essentially comprise for example plastic material based on charged polyethylene or charged polypropylene.

The module 26 is preferably housed in a reception cavity 36 of the latter made inside the structure 18. In the example described, the cavity 36 extends substantially in the thickness of at least two layers of the structure 18.

In the case of the passport 10 corresponding to the first embodiment of the invention, the cavity 36 extends in the thickness of the cover sheet 20 and of the additional sheet 34 and terminates at the surface of the additional sheet 34 opposite the endpaper 22. More precisely, as is illustrated in the sectional view of FIG. 2, this shows especially that the cavity 36 comprises a base 38 and a peripheral wall 40 surrounding the base 38.

This peripheral wall 40 comprises especially a step 42 forming a peripheral internal rim 44 elevated relative to the support base 38 of the support 28 of the module 26. In the example described, the cavity 36 comprises a lower part of small surface and an upper part of large surface.

Also, step 42 is preferably localised inside the additional sheet 34. Thus, the upper part of the cavity 36 extends essentially in the additional sheet 34.

For example, the cavity 36 is made by machining, typically by milling or countersinking in two operations:
large countersinking to form the upper part corresponding to the depth of the step, this upper part is essentially located in the additional sheet 34; and
small countersinking to form the deeper lower part.

This petit countersinking passes through the thickness of the additional sheet 34 as far as the cover sheet 20.

In keeping with the invention, the module 26 comprises an embrittlement zone 46 of the module 26. For example, this embrittlement zone 46 is localised at the level of the connection between the microcircuit 32 and the support 28.

The module 26 is also arranged in the thickness of the structure 18 so that, during separation of two of the layers of the structure 18, for example the cover sheet 20 and the additional sheet 34, the embrittlement zone 46 is capable of breaking to cause destruction of the module 26.

The module 26 is especially formed, for example, by at least two parts 26A, 26B capable of being separated during separation of at least two layers of the structure 18. Of course, preferably in the event where the structure 18 comprises more than two layers, for example as in the example described, three layers, arrangement of the embrittlement zone of the module and/or arrangement of the module in the structure is selected such that separation of any two of the layers causes destruction of the module 26.

In the example described, the separation of the additional sheet 34 and of the cover sheet 20, or else the separation of the additional sheet 34 and of the endpaper 22 causes the destruction of the module 26.

For example, each part 26A, 26B is preferably solidly fixed to one of the layers and separation of two of the layers causes considerable stress in the embrittlement zone 46 leading to its rupture and the module 26 preferably gives way at this point.

In fact, the link between both the first part 26A and the first layer 22 and also the second part 26B and the second layer 20 is stronger than the link of the two parts 26A, 26B together, materialised by the embrittlement zone 46.

In a variant not illustrated in the figures, the embrittlement region 46 is formed by a fracture line extending inside the support 28 of the module 26. In this case, separation of the sheets 20 and 34 causes the support 28 of the module 26 to break and causes its destruction.

FIGS. 4 to 7 show a security document according to a second embodiment of the invention. In these figures, the elements similar to the elements of FIGS. 1 to 3 bear identical reference numerals.

Figure 4:
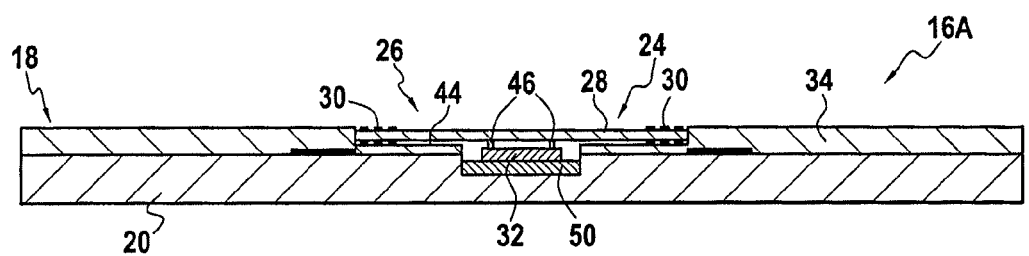
FIG. 4 illustrates the structure of FIG. 3 according to a second embodiment of the invention.

In this second mode, the structure 18 preferably comprises an electrically conductive ring 48. The function of this ring 48 is to improve the range of the module 26 (FIG. 4).

In fact, this electrically conductive ring 48 forms an amplification member of the antenna gain 30. Adding such an electrically conductive member significantly boosts performance of the antenna 30 by channeling the lines of the magnetic field emitted for example by an external terminal inside the antenna surface.

In this first embodiment, the member 48 forms an amplifier of the antenna gain, improving the level of current induced in the latter as well as the level of retro-modulation of the antenna 30 when the device is placed in the electromagnetic field of the external terminal.

According to this second embodiment, the member 48 extends around the antenna 30 outside the surface of the antenna 30. The antenna 30 and the ring 48 therefore preferably do not extend vis-à-vis each other so as not to mask the flux of the magnetic field across the antenna surface, the effect of which would finally reduce improvement in performance.

In other words, the member 48 extends preferably outside the external contours of the antenna 30 in a plane parallel to that containing the antenna 30 or part of the antenna or optionally in the same plane.

The principal steps of a production process of a document according to the second embodiment will now be described in reference to FIGS. 4 to 7.

Figure 5:
FIGS. 5 to 7 illustrate the production steps of a security document according to the second embodiment of the invention.

During a first step, illustrated by FIG. 5, a ring of electrically conductive ink 48 is deposited on a face of a cover sheet 20, for example by serigraphy.

Figure 6:
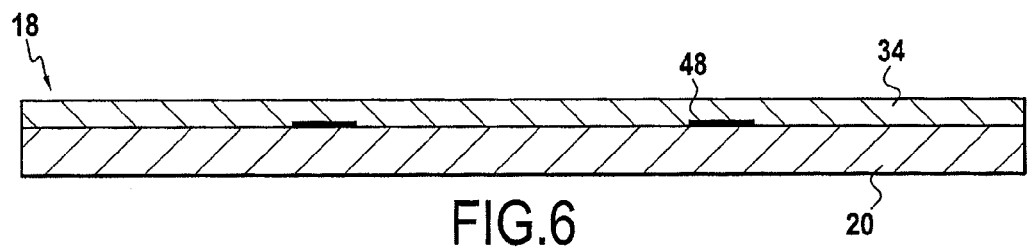

During a second step illustrated in FIG. 6, the additional sheet 34 is stacked on the cover sheet 20 and they are joined together for example by adhesion, hot or cold lamination, or by any other means adapted for assembling the two sheets together.

The result is a cover thickened by the presence of the additional sheet 34.

This forms a reception cavity 36 for the module 26 dimensioned to receive the whole module 26.

Figure 7:
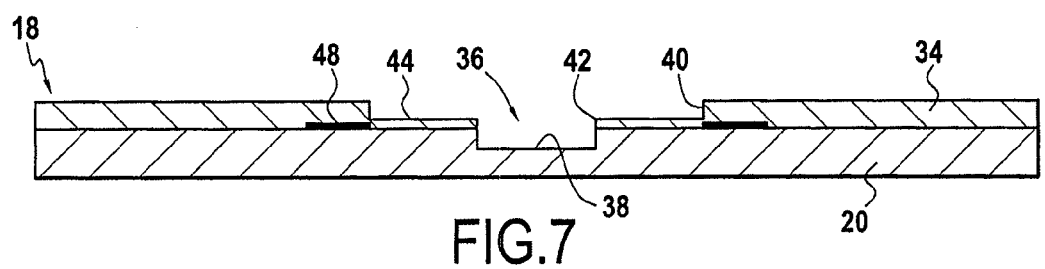

The cavity 36 is preferably machined inside the structure 18 formed by the two layers, in two steps: a large countersink and a small countersink (FIG. 7). Thus, the cavity 26 extends essentially inside the additional sheet 34 which is more easily machinable than the cover sheet 20. Also, the increase in thickness of the cover due to the additional sheet 34 makes it easier to house the module 26.

Then during a third step, the module 26 is taken into the cavity 36, then the module 26 is taken into the cavity 36. This module 26 is fixed to the multilayer structure 18 especially at the base 38 of the cavity 36 formed inside the cover sheet 20. Also, the support 28 of the module 26 is fixed to the cavity 36 by means of the rim 42 of the cavity 36 formed inside the additional sheet 34.

Once the cavity 36 is formed, a drop of adhesive 50 is deposited at the base of the cavity 36 and the module 26 is taken in such that the latter is fixed both to the first layer (in the present case, the cover sheet 20) by the drop of adhesive 50 and also to the second layer (in the present case, the additional sheet 34) at the level of the rim 42 of the cavity 36 for example also by adhesion.

Finally, the two additional sheets 34, 20 are assembled on the endpaper 22 to form the multilayer structure 18 which especially optically conceals the module 26 in the passport 10. Also, this sheet 22 is preferably adhered to the module 26. So when the sheet 22 and the sheet 34 are separated, the module 26 is preferably destroyed.

Of course, the invention is not limited to the embodiments just described.

In particular, the invention also applies to security or value documents in which the multilayer structure incorporating the module is not assembled with a booklet, for example the document can be an ID card. The document can also be a microcircuit card, such as for example a bank card.

The invention claimed is:

1. A security document comprising a multilayer structure formed by at least two layers assembled together face to face and a near-field communication device incorporated in the thickness of the structure, wherein the device is in the form of a module comprising a support bearing a near-field communication antenna and a microcircuit and wherein the module comprises an embrittlement zone capable of breaking during separation of at least the two layers to cause destruction of the module.

2. The document as claimed in claim 1, wherein the embrittlement zone extends between first and second parts of the module.

3. The document as claimed in claim 2, wherein the first part of the module comprises the antenna and the second part comprises the microcircuit.

4. The document as claimed in claim 3, wherein the first part stays assembled with a first one of the layers and the second part stays assembled with a second one of the layers during separation of the first and second layers.

5. The document as claimed in claim 1, wherein, the document comprising a plurality of sheets joined together to form a booklet, at least the two layers of the structure correspond to a cover sheet and to an endpaper of the booklet.

6. The document as claimed in claim 5, wherein the structure further comprises an additional sheet interleaved between the cover sheet and the endpaper, inside which the module is arranged at least partially.

7. The document as claimed in claim 1, wherein the module is housed in a cavity made in the thickness of at least two layers of the structure.

8. The document as claimed in claim 7, wherein the cavity comprises a deep central reception region of the microcircuit and a peripheral region elevated surrounding the central support region of the support of the module and delimiting a step, the peripheral region extends entirely in one of the two layers.

9. The document as claimed in claim 6, and wherein the module is housed in a cavity made in the thickness of at least two layers of the structure, and wherein the cavity extends in the thickness of at least the cover sheet and the additional sheet.

10. The document as claimed in claim 9, wherein the microcircuit is fixed to the base of the cavity and the module support is solid with the additional sheet and/or of the endpaper, to cause detachment of the support and of the microcircuit.

11. The document as claimed in claim 6, wherein the additional sheet has a thickness greater than or equal to the thickness of the support.

12. The document as claimed in claim 6, wherein the additional sheet is made of material more easily machinable than the material forming the cover sheet.

13. The document as claimed in claim 6, wherein the additional sheet is made of material comprising synthetic and/or natural fibres.

14. The document as claimed in claim 1, wherein the module is optically concealed in the multilayer structure.

15. The document as claimed in claim 1, wherein the support is made from material comprising essentially epoxy and has a thickness of less than 200 micrometers.

16. The document as claimed in claim 15, wherein the support has a thickness of between 70 and 100 micrometers.

17. The document as claimed in claim 1, wherein the microcircuit is assembled by die bonding and is flip-flop mounted in the module, or is mounted on the support by a cabling process known as wire bonding.

18. The document as claimed in claim 1, wherein the antenna extends over a single face of the support or extends in two parts on each of the faces of the support.

19. The document as claimed in claim 1, wherein the module is fixed to a first of the at least two layers by a drop of adhesive and to a second of the at least two layers at the level of a rim of a cavity.

20. The document as claimed in claim 19, wherein the module is also adhered to a third of the at least two layers.

* * * * *